United States Patent
McIntyre et al.

(10) Patent No.: US 9,319,848 B2
(45) Date of Patent: Apr. 19, 2016

(54) AUDIENCE RESPONSE COMMUNICATION SYSTEM WITH LONG BEACON

(71) Applicant: Macmillan New Ventures, LLC, New York, NY (US)

(72) Inventors: James E. McIntyre, Indianapolis, IN (US); John W. Sawyer, Indianapolis, IN (US)

(73) Assignee: Macmillan New Ventures, LLC, New York, NY (US)

( * ) Notice: Subject to any disclaimer, the term of this patent is extended or adjusted under 35 U.S.C. 154(b) by 17 days.

(21) Appl. No.: 14/268,713

(22) Filed: May 2, 2014

(65) Prior Publication Data

US 2015/0319583 A1    Nov. 5, 2015

(51) Int. Cl.
| | | |
|---|---|---|
| H04H 40/00 | (2009.01) | |
| H04W 4/06 | (2009.01) | |
| G07C 13/00 | (2006.01) | |
| H04W 4/20 | (2009.01) | |

(52) U.S. Cl.
CPC .............. *H04W 4/06* (2013.01); *G07C 13/00* (2013.01); *H04W 4/206* (2013.01)

(58) Field of Classification Search
CPC . H04W 74/06; H04W 74/08; H04W 74/0808; H04W 74/0833
USPC .............. 455/237.1, 410, 412.2, 411, 3.06; 379/92.02, 92.01; 705/72
See application file for complete search history.

(56) References Cited

U.S. PATENT DOCUMENTS

| | | | |
|---|---|---|---|
| 7,071,824 B2 | 7/2006 | Trosper | |
| 7,231,221 B2 | 6/2007 | Assarsson et al. | |
| 7,391,314 B2 | 6/2008 | Lemmon | |
| 7,508,811 B2 | 3/2009 | Shao et al. | |
| 7,792,066 B2 | 9/2010 | Fujii et al. | |
| 8,045,494 B2 | 10/2011 | Habetha et al. | |
| 8,102,835 B2 | 1/2012 | Shao et al. | |
| 8,385,322 B2 | 2/2013 | Colling et al. | |
| 8,467,357 B2 | 6/2013 | Wang et al. | |
| 2003/0223554 A1* | 12/2003 | Zhang | G06Q 99/00 379/93.12 |
| 2006/0294216 A1* | 12/2006 | Swanson | G06Q 30/02 709/223 |
| 2010/0177762 A1 | 7/2010 | Amir et al. | |
| 2010/0185957 A1 | 7/2010 | Van Ieperen et al. | |
| 2010/0202354 A1 | 8/2010 | Ho | |
| 2010/0311031 A1 | 12/2010 | Beavers et al. | |
| 2011/0164605 A1 | 7/2011 | Zhen et al. | |
| 2011/0317692 A1 | 12/2011 | Guttman et al. | |

(Continued)

OTHER PUBLICATIONS

"An Introduction to IEEE STD 802.15.4"; http://sonoma.edu/users/f/farahman/sonoma/courses/cet543/resources/802_intro_01655947.pdf; Adams, 2006.

(Continued)

*Primary Examiner* — Tu X Nguyen
(74) *Attorney, Agent, or Firm* — Olson & Cepuritis, Ltd.

(57) ABSTRACT

The present invention is directed to an audience response communication system that reduces transmission traffic by utilizing a beacon transmission as a vehicle to transmit additional data. A typical system comprises a base unit and a plurality of remote input devices. The base unit and the remote input devices include processing units and communication devices such that data is transmitted between the base unit and the remote input devices. The beacon, which serves the typical uses of a beacon, further serves to deliver information such as vote acknowledgements, welcome messages, or the like.

8 Claims, 2 Drawing Sheets

(56) References Cited

U.S. PATENT DOCUMENTS

| | | |
|---|---|---|
| 2012/0155349 A1 | 6/2012 | Bajic et al. |
| 2013/0070751 A1 | 3/2013 | Atwal et al. |
| 2013/0077546 A1 | 3/2013 | Liu et al. |
| 2013/0084553 A1 | 4/2013 | Kaneko et al. |
| 2013/0164725 A1 | 6/2013 | Robbins et al. |
| 2013/0182637 A1 | 7/2013 | Joo et al. |
| 2013/0235773 A1 | 9/2013 | Wang et al. |
| 2013/0279382 A1 | 10/2013 | Park et al. |
| 2013/0302767 A1 | 11/2013 | Hipskind |

OTHER PUBLICATIONS

"IEEE 802.15.6 WBAN Beaconing for Wireless USB Protocol Adaptation"; http://www.sersc.org/journals/IJSEIA/vol7_no4_2013/1.pdf; Hur et al., Jul. 2013.

* cited by examiner

AUDIENCE RESPONSE COMMUNICATION SYSTEM WITH LONG BEACON

FIELD OF THE INVENTION

This invention relates to an audience response communication system, and in particular, to a wireless communication system that allows for efficient data transfer between a base unit and remote units with less interference from other transmissions through the use of a long beacon message.

BACKGROUND OF THE INVENTION

Audience response systems enable groups of people, such as meeting participants, students, or audience members to vote wirelessly on a topic or to respond to questions submitted by a host, instructor, or presenter. Different audience response systems are known and have been used in numerous applications including education, audience participation, game shows, voting at conferences, opinion polls, and the like.

Various audience response systems include one or more base station RF transceivers. These base stations may be connected to a computer that may execute audience response system software. The base stations may also be adapted to communicate with several wireless keypads or other input devices adapted to enable a user to select a response to an inquiry. The base station transmits data inviting a response from the remote input devices. Audience members enter their responses to a question posed by the presenter by using their input devices. The audience responses are then communicated to the base station. The responses may then be stored, tallied, and/or displayed using the audience response system software.

Various transmission protocols, such as Wi-Fi, Cellular, wiMax, and Bluetooth are known in the art. All wireless transmissions operate within frequencies of the radio spectrum of the electromagnetic spectrum that are available for communication. These frequencies are treated as a public resource and are regulated by national organizations such as the Federal Communications Commission in the United States, or Ofcom in the United Kingdom. These agencies determine which frequency ranges can be used for what purpose and by whom. Wireless communication spans the spectrum from 9 kHz to 300 GHz. For example, Wi-Fi is a common wireless local area network using microwaves in the 2.4 GHz and 5 GHz bands that enables portable computing devices to connect easily to the Internet. Wi-Fi has become the de facto standard for access in private homes, within offices, and at public hotspots. Wi-Fi also allows communications directly from one device to another without an access point intermediary.

Because of the ubiquitous nature of radio transmissions, however, wireless transmissions often face problems with interference from other competing transmissions. For example, several other transmission protocols also operate within the operating frequencies of Wi-Fi including cordless telephones, baby monitors, Bluetooth devices, car alarms, and even microwave ovens.

Wireless communications typically include management and control information to support data transfer. A beacon sent from a base unit to a plurality of remote units enables a wireless system to maintain communications in an orderly fashion. The beacon may contain information about the network, and is transmitted by a base unit on a periodic basis. The time interval from the start of one beacon to the start of the next is called the beacon interval.

SUMMARY OF THE INVENTION

The present invention provides an audience response communication system that improves upon the transmission of data and messages between a base unit and a plurality of remote input devices by reducing overall data transmission traffic. By utilizing the beacon for the dual purposes of synchronizing transmissions from the remote input devices and sending data to them, the need for separate messages between the base unit and the remote units is reduced.

The audience response communication system includes a base unit and a plurality of remote input devices. The base unit includes a processing unit, such as a computer, and a communication device, such as a wireless transceiver. The computer and communication device may be separate, connectable devices, or may be an integrated device. For example, a PC may be connected to a transceiver via a connection port, or the PC may have an integrated transceiver. The computer may also be a conventional laptop computer, desktop computer, smartphone, personal computing device, tablet computer, or the like. Each of the plurality of remote input devices also includes a processing unit, such as an IC chip, and a communication device, such as a wireless transceiver that is adapted to communicate with the base unit communication device. The base unit and plurality of remote input devices may be adapted to enable a user to choose from multiple input options, and have the user's choices transmitted to the base unit so that the inputs from the various users may be processed by the base unit.

Wireless communications generally require the sending and receiving units to include identification and authentication information with every transmission. In a voting situation, when a user submits a vote, the vote message transmitted from the remote unit to the base unit would include such identification and authentication information. In typical systems, the base unit would, upon receipt of a vote message, transmit an acknowledgement message that would also include identification and authentication information. In that typical system, beacons would continue to be sent along with their identification and authentication information.

In order to reduce the amount of wireless transmission traffic, the base is configured to utilize the beacon discussed above, referred to here as a short beacon. A beacon may also incorporate additional information that may be received and acted upon by the remote input devices. A short beacon with the additional information is referred to as a long beacon. In typical wireless systems, a short beacon frame will be sent at regular intervals from the base unit to the remote input devices to announce its presence. In the present audience response communication system, the base unit will transmit a short beacon the majority of the time. By re-using the short beacons, which are necessarily periodically transmitted by the base unit, as a vehicle to convey additional useful information, i.e., a long beacon, overall wireless transmission traffic is reduced. This is because the transmission of separate messages to perform various tasks is avoided.

For example, in other audience response systems, when a vote is received by a base unit from a remote input device, the base unit must send a separate acknowledgement message. The base unit will also continue to send beacon frames. According to the present invention, in this example, the vote acknowledgement is added to the short beacon to form a long beacon, and the need for a separate vote acknowledgement message in addition to the beacon message is avoided. Since the short beacons are already being periodically transmitted, and they already include any necessary identification and authentication information, as well as time synchronization necessary for protocols such as slotted ALOHA, the overall wireless transmission traffic is reduced.

The additional information that is added to the short beacon to form the long beacon will include at least an identifier tag and a field of data values. The identifier tag will convey what type of information is included in the long beacon, and will also signify the byte length of the data field. Examples of identifier tags and their associated data fields are shown in Table 1 below:

TABLE 1

| Identifier Tag | Data Field |
|---|---|
| 1 | Vote acknowledgement (for multiple votes) |
| 2 | Multiple answers |
| 3 | Individual remote request (for multiple remotes) |
| 4 | Correct answers |
| 5 | Both individual remotes and correct answers |
| 6 | Welcome message |
| '7 | Test beacon |

A brief explanation of some of the information that may be transmitted via the long beacon is discussed below.

One example of information to be transmitted that is included in Table 1 is vote acknowledgements. As shown in Table 1, identifier tag '1' is used for the data field value of a vote acknowledgement for multiple votes. In typical audience response systems, after a vote is submitted by a user and received by the base unit, the base unit will transmit a vote acknowledgement back to the remote unit. Because of this, during any polling session, multiple remote units will be transmitting votes to the base unit, with an acknowledgement being sent each time from the base unit. In a system where multiple responses are permitted, the repeated transmission of votes and acknowledgements constitute a large amount of data transmission traffic. However, by including a batch of acknowledgements as part of a beacon message that is already sent periodically, the overall number of transmissions is reduced, thereby reducing traffic in the system.

Another example of a long beacon message relates to identifier tag '2' and the corresponding data field. This message, pertaining to multiple answers, informs the remote unit how many answers are expected for a specific question.

Another example of a long beacon message relates to identifier tag '3' for remote identification. Typical beacon messages are broadcast to all remote input units within range. This message is directed to a subset of the remote units by using remote IDs included in the long beacon message. The remote ID information is one example of information that may be combined with other data added to the long beacon message.

Yet another example of a long beacon message relates to the identifier tag '4' for a correct answer. This particular data field may be bundled with the remote ID information so that only specific remote units are sent the correct answer.

By incorporating instructions or messages in a beacon message, the need for separate transmissions with the additional instructions or messages is reduced, and thus, network traffic is reduced. These and other objects, advantages and features of this invention will become apparent upon review of the following specification in conjunction with the drawings.

DETAILED DESCRIPTION OF PREFERRED EMBODIMENTS

The detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
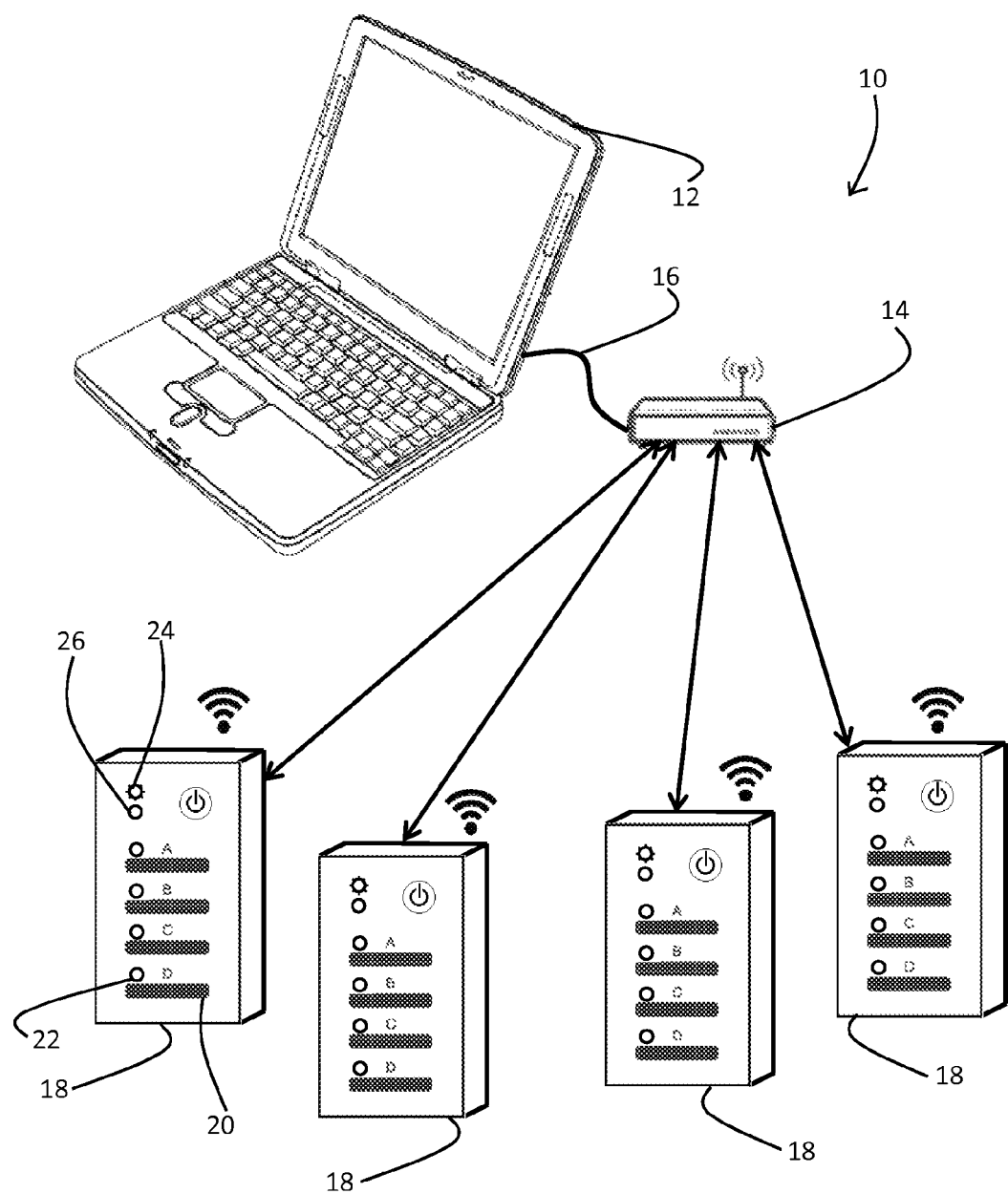
FIG. 1 illustrates an audience response and communication system according to one embodiment of the present invention.

Referring to FIG. 1, a schematic of a preferred embodiment of a system according to the present embodiment is depicted. System 10 comprises a base unit, which in this embodiment comprises a computer 12 and a communication device such as wireless transceiver 14. While in this embodiment the computer 12 and wireless transmitter are connected by a USB connector 16, the base unit may be an integrated unit where the computer includes an internal wireless transceiver. The computer 12 may also include the software to operate the system in memory, or access such software via a wired network or a wireless connection, such as the Internet. Alternatively, the wireless transceiver 14 may be a wireless dongle that also includes the software run by the base unit. The computer 12 shown is a conventional laptop computer; however, any computing device adapted to run the appropriate software may be utilized, such as a desktop computer, smartphone, tablet computer, or the like.

Adapted to wirelessly communicate with transceiver 14 are a plurality of remote input devices 18. Each of the plurality of remote input devices includes a communication device such as a transceiver that is adapted to communicate with the base unit. Each of the plurality of remote input devices is configured to provide a user with a plurality of input options. In the embodiment shown, each of remote input devices 18 includes a plurality of pressable keys or buttons as the input options 20. As shown, in this embodiment, the user is provided with input options "A", "B", "C", and "D". Any number of input options, or configurations for the remote input device may be utilized. Each of the input options has an LED light 22 associated with it. In this embodiment, LED lights 24 and 26 are also provided to indicate that the remote input device is powered on and also to indicate whether polling is open. For example, light 24 may emit a green light to indicate that polling is open, while light 26 may emit a red light to indicate that polling is closed, or that a vote was not acknowledged. LED lights 24 and 26 may also be adapted to flash to indicate lack of connection with the base unit.

Figure 2:
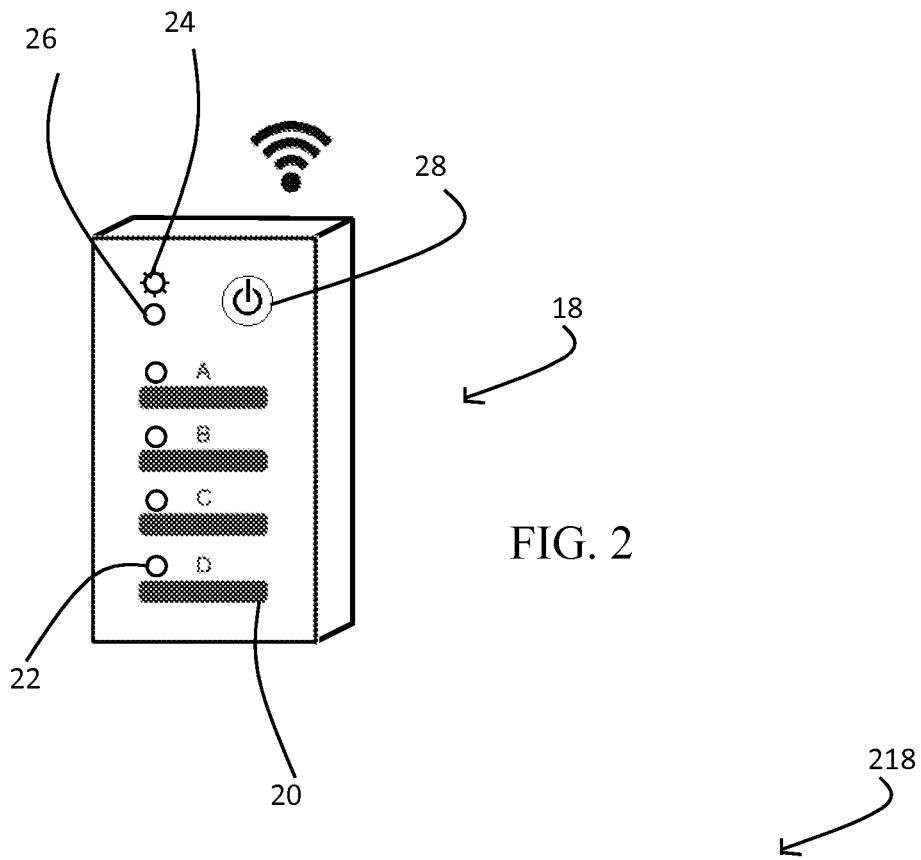
FIG. 2 illustrates a preferred embodiment of a remote input device of the audience response communication system.
Figure 3:
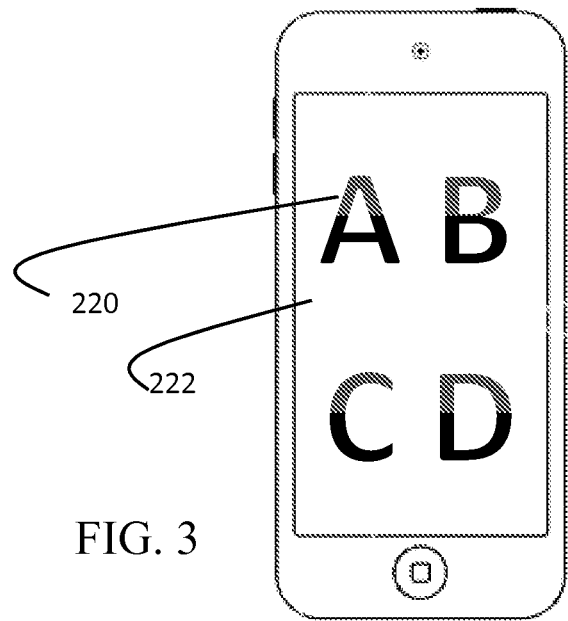
FIG. 3 illustrates an alternative preferred embodiment of a remote input device of the audience response communication system.

Two examples of remote input devices are shown in FIGS. 2 and 3. Referring to FIG. 2, a remote input unit 18 from FIG. 1 is shown. Each remote input device 18 is provided with a power button 28. Referring to FIG. 3, a smartphone or tablet computer based remote input unit is depicted. In this example, smartphone 218 is shown. Although not shown, the smartphone or tablet may include a separate attachable transceiver accessory. The particular smartphones or operating systems are within the discretion of the system provider. As shown, smartphone 218 displays on screen 222 a plurality of input options 220. The particular choices displayed may take any desired form. For example, rather than present letter choices to the user, number choices, pictographic choices, or full text answer choices may be presented. In a preferred embodiment, selection by a user of a particular choice will cause the display of that choice to change, e.g., change color, become highlighted, or the like, so as to indicate that it has been selected. It is contemplated that the audience response communication system may include any combination of input devices, e.g., a combination of tablet computers, smartphones, and remote input units. The specific type of input device may include any type of device wherein the user may select from a plurality of input options, and the input device transmits selected input options to the base unit.

The following is exemplary of the data and the packet structure included in a beacon message. Using a CC254x packet structure, a beacon packet will have the following structure where the preamble, sync word and CRC are defined:

TABLE 2

| Preamble | Sync Word | Length | Data | CRC |
| --- | --- | --- | --- | --- |
| 3 to 5 Bytes | 3 to 5 Bytes | 1 Byte | X Bytes | 2 Bytes |

The Sync Word for each beacon will be unique for a particular audience, e.g., a classroom. The Room Code for the classrooms may be identified by a short code such as AA, AB, AC, AD, BA, BB, BC, BD, CA, CB, CC, CD, DA, DB, DC or DD. Examples of appropriate Sync Words are shown in Table 3 below:

TABLE 3

| Room Code | Sync Word | | | |
| --- | --- | --- | --- | --- |
| AA | 0x11 | 22 | 33 | 44 |
| AB | 0x22 | 33 | 44 | 55 |
| AC | 0x33 | 44 | 55 | 66 |
| AD | 0x44 | 55 | 66 | 77 |
| BA | 0x55 | 66 | 77 | 88 |
| BB | 0x66 | 77 | 88 | 99 |
| BC | 0x77 | 88 | 99 | AA |
| BD | 0x88 | 99 | AA | BB |
| CA | 0x99 | AA | BB | CC |
| CB | 0xAA | BB | CC | DD |
| CC | 0xBB | CC | DD | EE |
| CD | 0xCC | DD | EE | FF |
| DA | 0xDD | EE | FF | 00 |
| DB | 0xEE | FF | 00 | 11 |
| DC | 0xFF | 00 | 11 | 22 |
| DD | 0x00 | 11 | 22 | 33 |

Each beacon message may convey different information to the remote input devices, depending on the current state of the base. These may include information such as Room Code, an identification of the best channels available for transmissions, current base state, vote acknowledgement, identification of specific remotes, or transmission of a welcome message.

As discussed, a short beacon message will be sent by the base unit on a regular basis that includes information that announces the presence of the base unit. In the particular embodiment discussed, the information that must be available to the remotes are the Room Code, the identification of the best channels available for transmission, and the current base state. For example, base states for the base unit may include "off", "idle", or "voting". The base unit will transmit a short beacon the majority of the time.

Additional information to be conveyed in a beacon message as a long beacon will include an identifier tag and a field of data values. The identifier tag will convey what type of information is included in the long beacon, and will also signify the byte length of the data field.

The plurality of remotes are configured to receive the identifier tag and the field of data values and perform a particular function based on the particular identifier tag and the field of data values transmitted in the long beacon. For example, if a long beacon includes an individual remote request, i.e., a message directed to a particular remote unit, the remote unit may perform a function if the message was designated for that remote unit, or may ignore the message if it was not. As discussed, after a remote unit sends a vote, it will wait for a vote acknowledgement. If the long beacon does not include a vote acknowledgement identifier tag and field of data values that includes an acknowledgement for that individual remote, the remote unit will continue to wait for some amount of time, and may display an error message if no vote acknowledgement is received in that time. If, however, the remote unit receives a vote acknowledgement identifier tag and field of data values, it will perform the function of generating an indication that the vote was received.

Other long beacons may include a correct answer identifier tag and field of data values, which causes the particular remote unit to generate a correct answer indicator. In still other long beacons, the message may be intended for all remote units. For example, an identifier tag and field of data may correspond to the sending of a welcome message, which will cause the remote to perform the function of displaying a welcome message.

The long beacon may be better understood though an example. In a classroom setting, an instructor may start a polling session by powering on the base unit and initiating the presentation of questions. The base unit will generate a beacon that is sent to the remote input devices. In most cases the beacon will be a short beacon that announces the presence of the base unit and provides information for the remote input devices in the classroom. However, to the extent that the instructor wishes to send a "welcome" message, he or she can cause the base unit to generate a long beacon that includes the identifier tag '6' and the welcome message text.

The remote input devices will listen for beacons, whether long or short, before sending a response. For example, during a voting session, a user will enter his or her votes with the input device. The remote input device, however, will not immediately send the vote to the base unit. Instead, the remote input device will wait for a beacon from the base unit. A beacon is sent at a regular interval, usually less than 100 milliseconds. Thus, to the user, there is no perceptible delay in the transmission while waiting for a beacon.

After a remote input device transmits a vote to the base unit, the base unit will generate and transmit a long beacon including a vote acknowledgement at the next beacon interval. More typically, the base unit will generate a long beacon with vote acknowledgements for multiple remote input devices.

Alternatively or additionally, the long beacon may include a correct answer indicator. In response, certain of the remote input devices will generate an indicator to the user. Other long beacons may cause the remote input devices to generate other indicators to the user. The form of the indicator will depend on the long beacon data field values. For example, the indicator may be the display of a welcome message, a light indicating that a vote was received, a visual indicator of a correct answer, a message for the user from the instructor, an error message, etc.

It is understood that the exemplary system and method described herein and shown in the drawings represent only presently preferred embodiments of the invention. Various modifications and additions may be made to such embodiments without departing from the spirit and scope of the invention.

What is claimed is:

1. An audience response communication system comprising:
    a base unit and a plurality of remote input devices;
    the base unit configured to transmit both short beacon messages and long beacon messages to the plurality of remote input devices, wherein the short beacon messages are transmitted periodically and each long beacon message comprises one of the short beacon messages combined with an identifier tag and a field of data values;
    the plurality of remote input devices is configured to receive the short and long beacon messages, and to perform a designated function corresponding to the identifier tag and the field of data values of the long beacon message.

2. The audience response communication system of claim 1, wherein the identifier tag and field of data values comprises at least one of a vote acknowledgement, an individual remote request, a welcome message or a correct answer indicator.

3. An audience response and communication system comprising:
    a base unit and a plurality of remote input devices;
    the base unit configured to transmit a beacon message at regular intervals to the plurality of remote input devices, the beacon message comprising authentication information, and at least one of the beacon messages being a long beacon message comprising the authentication information, and further including an identifier tag and a field of data values.

4. The audience response communication system of claim 3, wherein the identifier tag and the field of data values comprises an individual remote request, and at least one of the plurality of remote input devices is identified in the individual remote request, and the at least one of the plurality of remote input devices identified in the individual remote request is configured to perform a designated function corresponding to the identifier tag and the field of data values.

5. The audience response communication system of claim 3, wherein the identifier tag and the field of data values comprises at least one of a vote acknowledgement, an individual remote request, a welcome message or a correct answer indicator.

6. An audience response system utilizing slotted ALOHA, the response system comprising:
    a base unit and a plurality of remote input devices;
    the base unit adapted to transmit periodic beacon messages, the beacon messages comprising a plurality of short beacons and at least one long beacon;
    each of the short beacons comprising short beacon information comprising system authentication information, and the short beacons further adapted to synchronize timing of the base unit and the plurality of remote input devices;
    the at least one long beacon comprising the short beacon information, and further comprising an identifier tag and a field of data values, the base unit adapted to transmit the at least one long beacon to deliver instructions to at least one of the plurality of remote input devise.

7. The audience response system of claim 6, wherein the identifier tag and the field of data values comprises an individual remote request, and at least one of the plurality of remote input devices is identified in the individual remote request, and the at least one of the plurality of remote input devices identified in the individual remote request is configured to perform a designated function corresponding to the identifier tag and the field of data values.

8. The audience response system of claim 6, wherein the identifier tag and the field of data values comprises at least one of a vote acknowledgement, an individual remote request, a welcome message or a correct answer indicator.

* * * * *